No. 658,578. Patented Sept. 25, 1900.
W. N. PARKES.
BUTTONHOLE SEWING MACHINE.
(Application filed Sept. 12, 1898.)
(No Model.) 9 Sheets—Sheet 1.
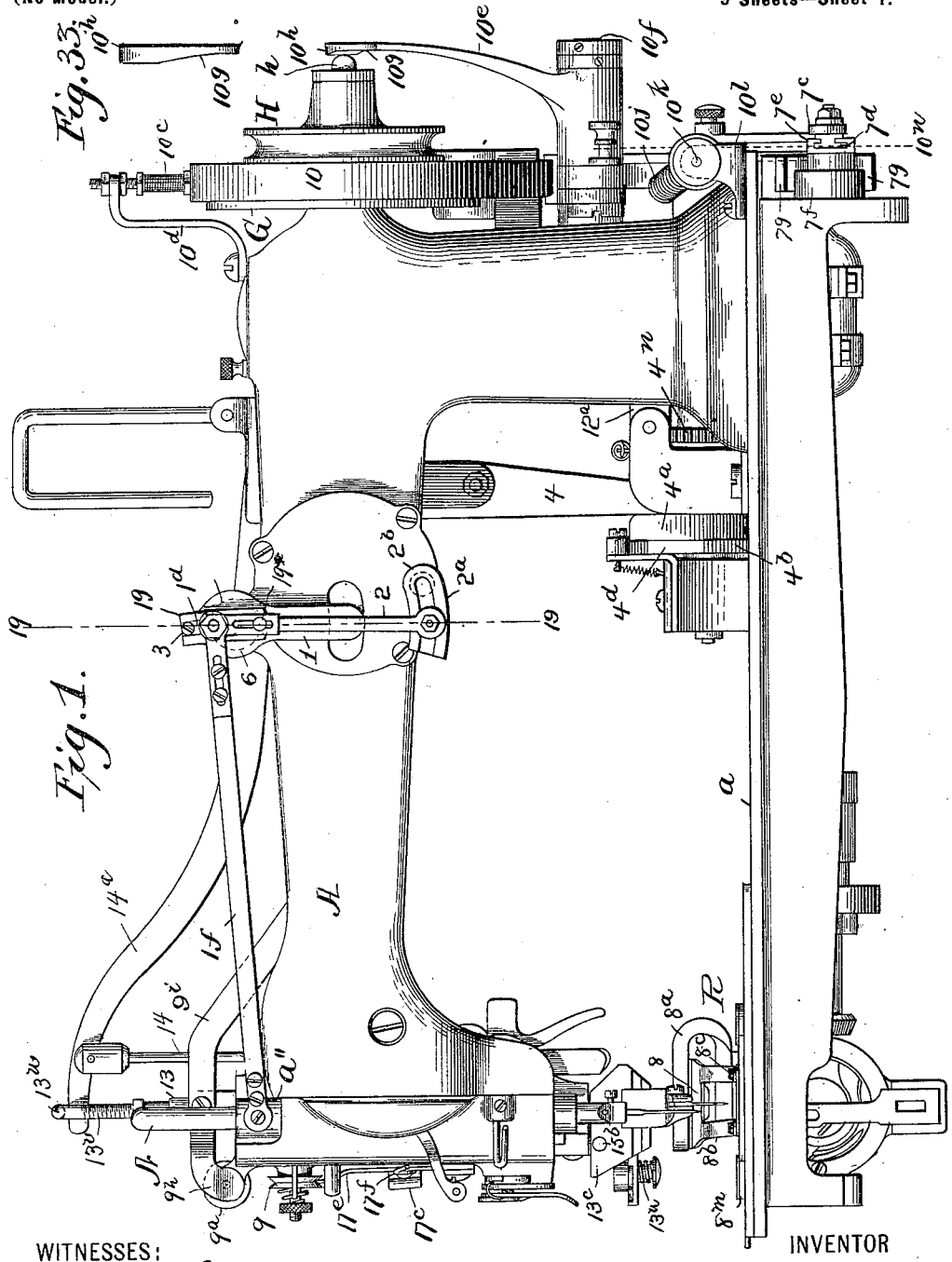
WITNESSES:
INVENTOR
William N. Parkes
BY
William R. Baird
ATTORNEY

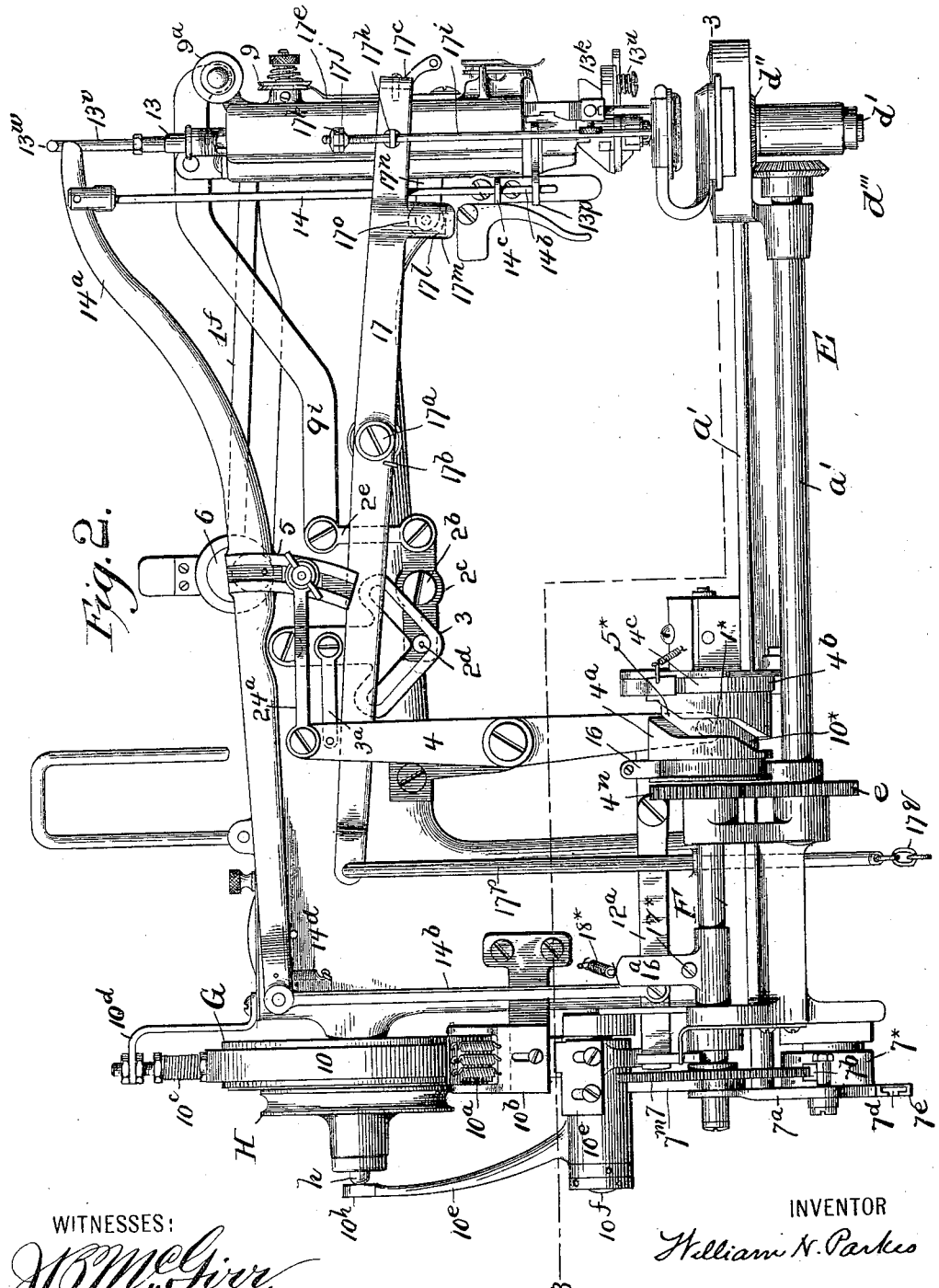

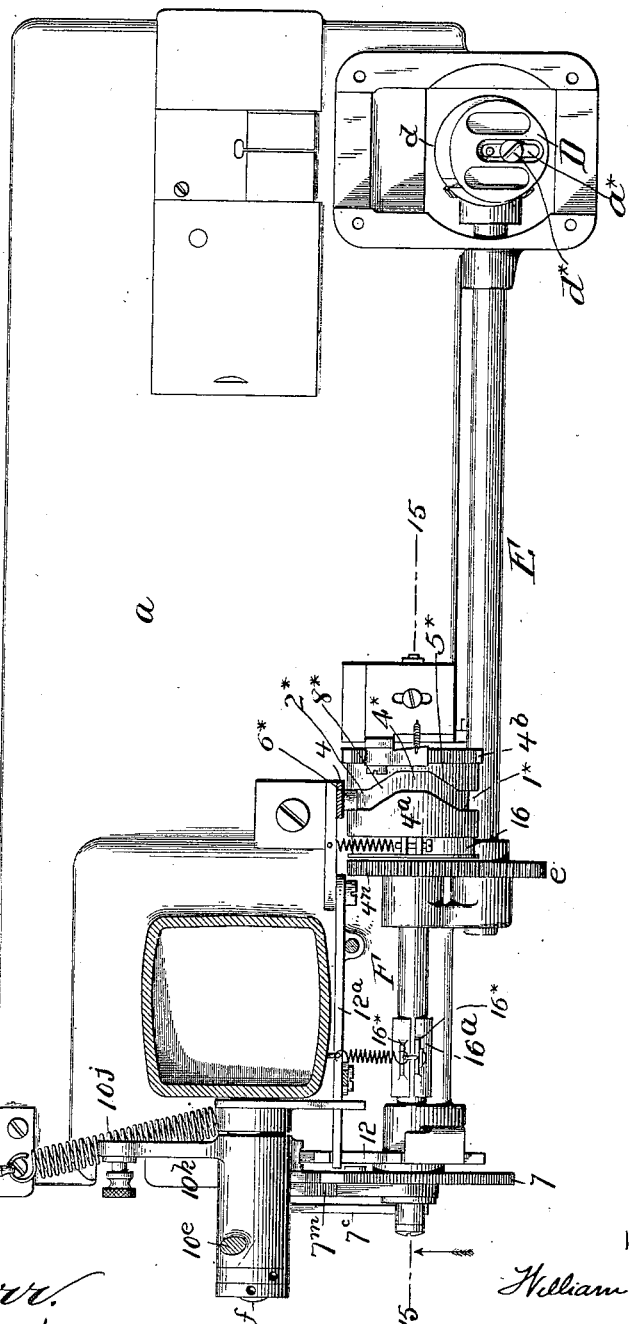

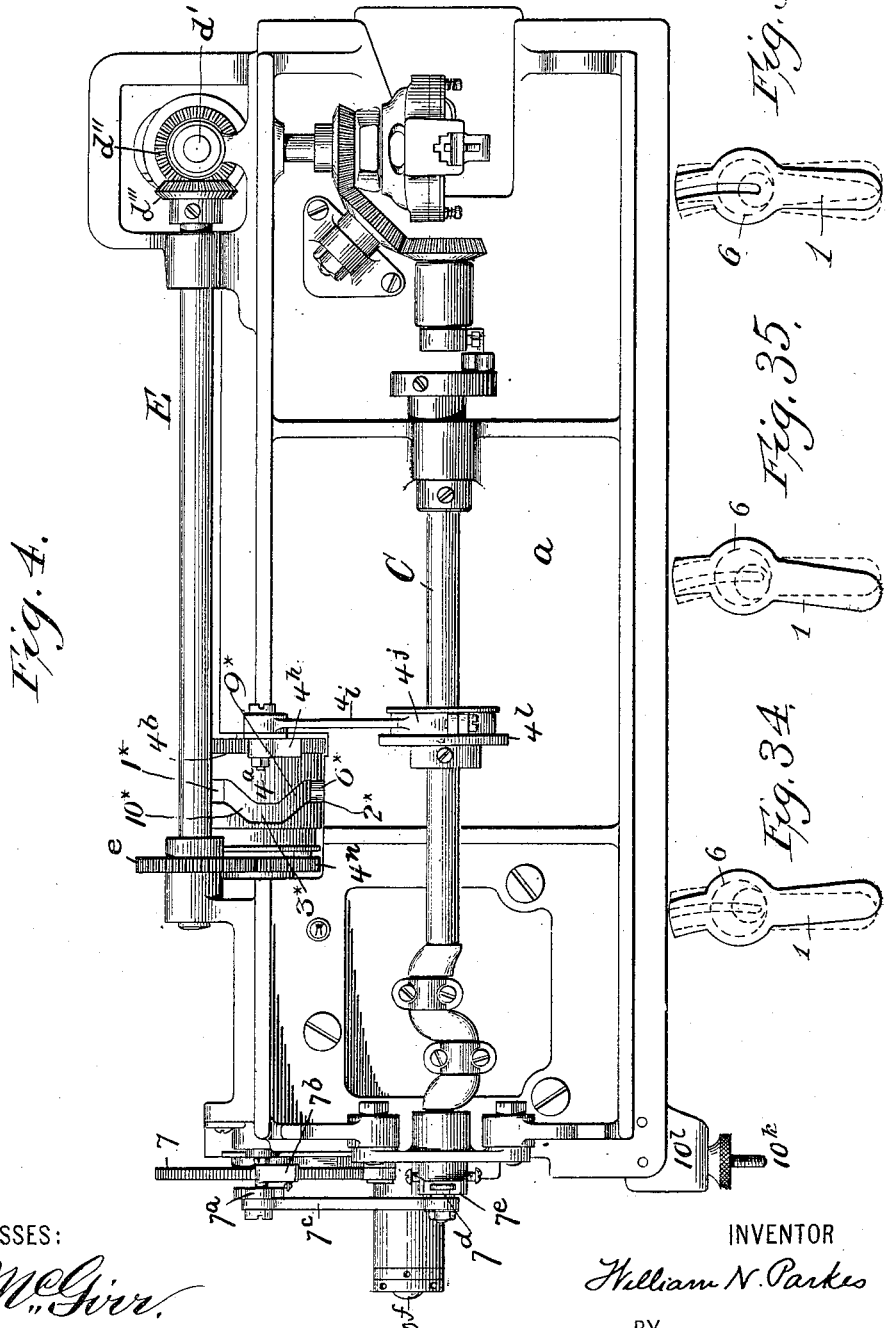

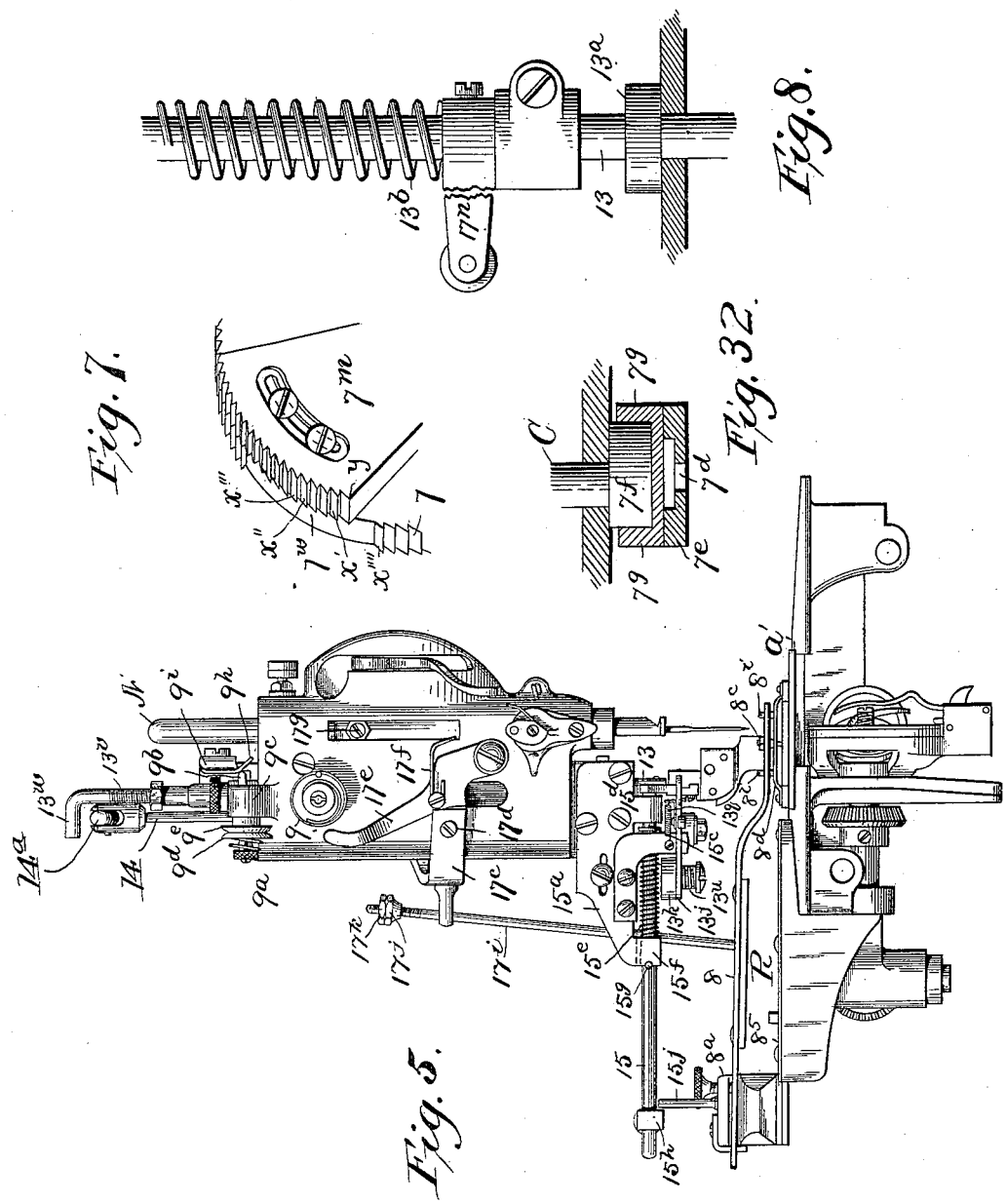

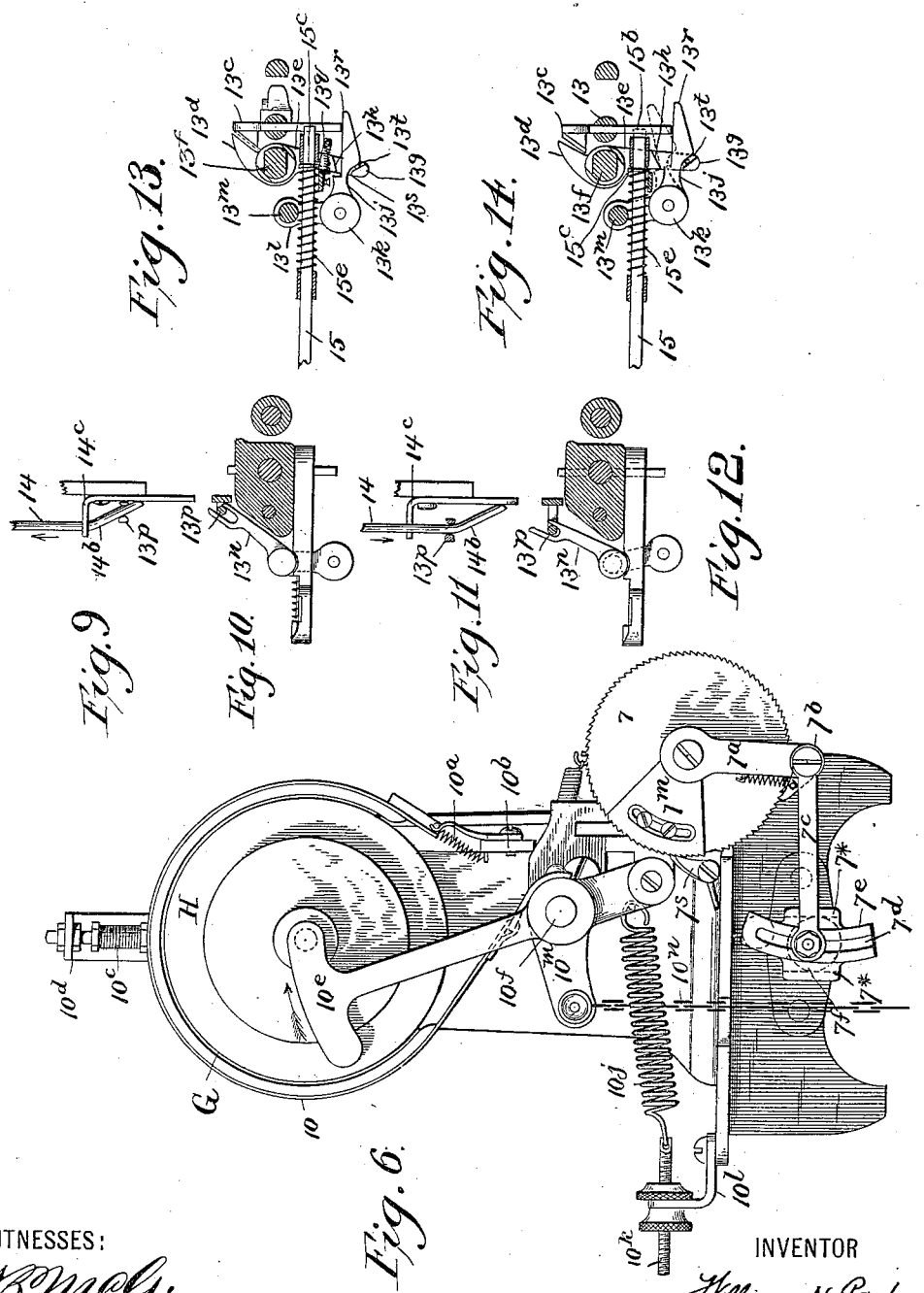

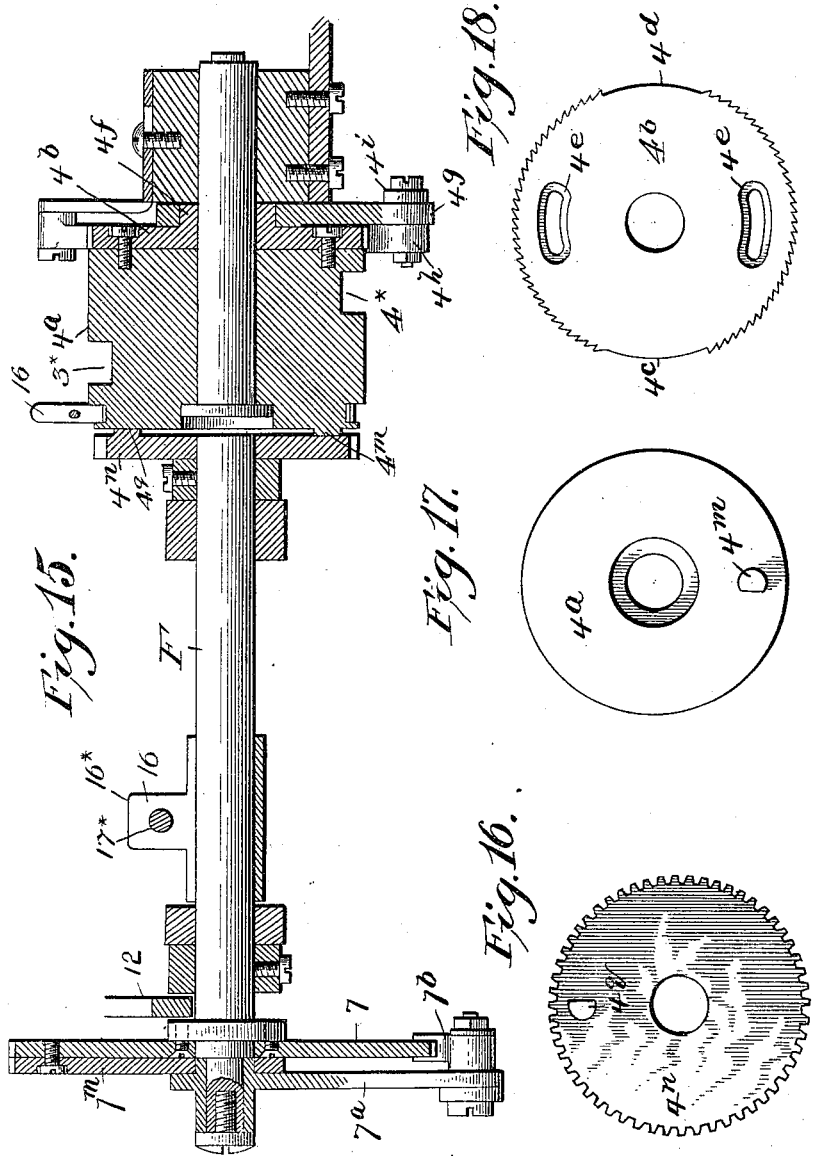

No. 658,578. Patented Sept. 25, 1900.
W. N. PARKES.
BUTTONHOLE SEWING MACHINE.
(Application filed Sept. 12, 1898.)
(No Model.) 9 Sheets—Sheet 8.
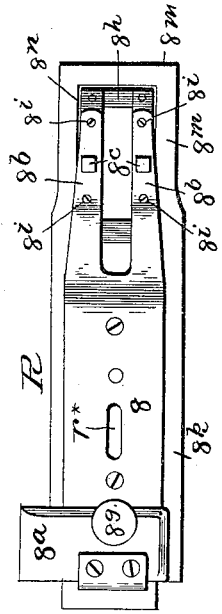
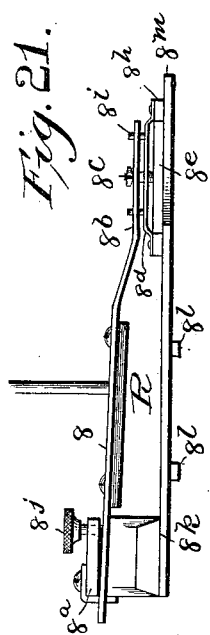
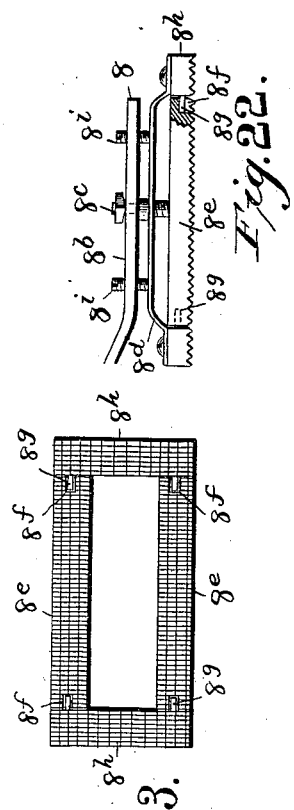
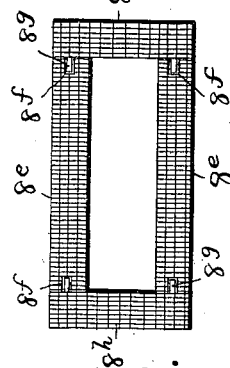
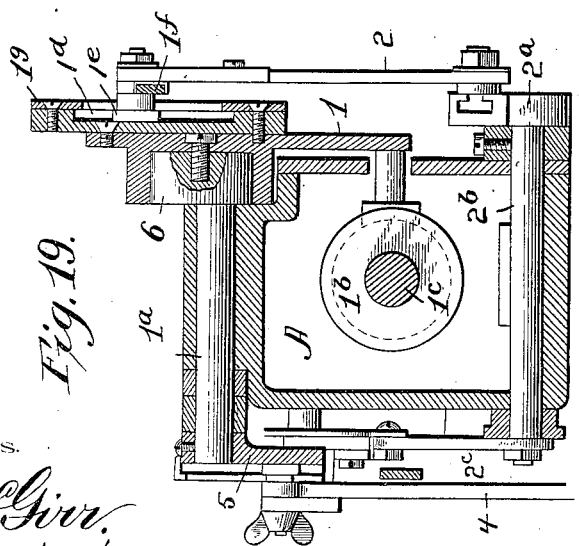
Witnesses.
J. B. McGivr.
Chester H. Higgins
Inventor.
William N. Parkes
By William R. Baird
Attorney.
THE NORRIS PETERS CO., PHOTO-LITHO., WASHINGTON, D. C.

No. 658,578. Patented Sept. 25, 1900.
W. N. PARKES.
BUTTONHOLE SEWING MACHINE.
(Application filed Sept. 12, 1898.)

(No Model.) 9 Sheets—Sheet 9.

Witnesses.
J. B. McGirr.
Chester H. Higgins

Inventor.
William N. Parkes
By William R. Baird
Attorney.

UNITED STATES PATENT OFFICE.

WILLIAM N. PARKES, OF NEW YORK, N. Y.

BUTTONHOLE-SEWING MACHINE.

SPECIFICATION forming part of Letters Patent No. 658,578, dated September 25, 1900.

Application filed September 12, 1898. Serial No. 690,777. (No model.)

*To all whom it may concern:*

Be it known that I, WILLIAM N. PARKES, of the borough of Brooklyn, New York city, county of Kings, and State of New York, have invented certain new and useful Improvements in Buttonhole-Sewing Machines, of which the following is a specification.

One of the main objects of my invention is to provide a buttonhole-sewing machine in which the work has no lateral movement; and to this end I use, broadly speaking, the needle-bar movement which I use in my ornamental-stitch-sewing machine patented October 26, 1897, No. 592,510.

It is also an object of this invention to provide means, in combination with the stitching mechanism, for barring or tacking the ends of the holes, which means will move rapidly enough for this purpose and not interfere or affect the feeding mechanism or the feed of the work.

These and other objects will appear more clearly when described in connection with the drawings.

The tension-controller mechanism, the stop-motion, work-carrier, cutting device, and device for preventing the stop-motion from being returned to its normal position until the cutter has been raised to its elevated position each forms the subject-matter, respectively, of the following copending applications: Serial No. 733,225, filed October 10, 1899, Serial No. 733,226, filed October 10, 1899, Serial No. 733,227, filed October 10, 1899, Serial No. 2,570, filed January 24, 1900, and Serial No. 199, filed January 3, 1900. These devices form no part in themselves of my present invention and are separately claimed in the above-referred-to applications. They are fully illustrated and described in order that the entire workings of the machine may be thoroughly understood.

Figure 24:
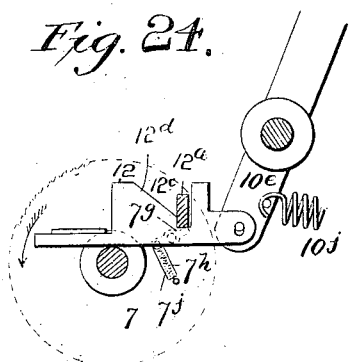
Figure 25:
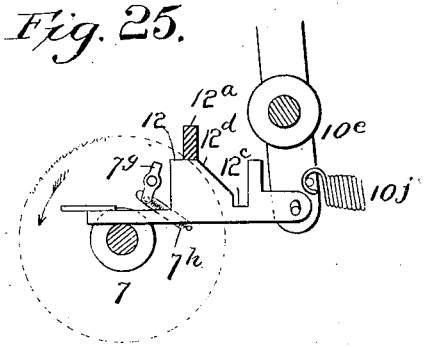
Figure 27:
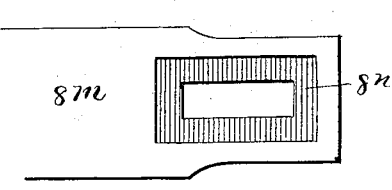
Figure 26:
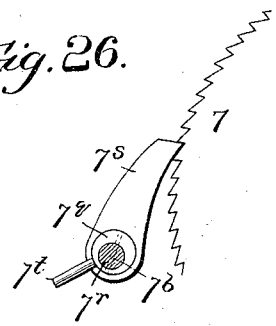
Figure 29:
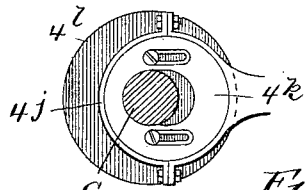
Figure 28:
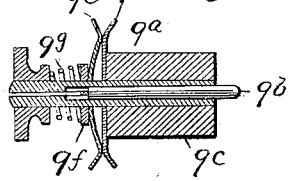
Figure 30:
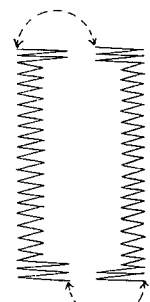
Figure 31:
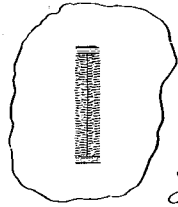

Referring to the drawings, Figure 1 is a front elevation of a buttonhole-sewing machine embodying my invention. Fig. 2 is a rear elevation. Fig. 3 is a top plan view beneath the plane of the section-line 3 3 in Fig. 2. Fig. 4 is a bottom plan view. Fig. 5 is a front end elevation. Fig. 6 is a rear end view. Fig. 7 is a detail perspective of the feed-wheel and segment attached thereto. Fig. 8 is a detail of the cutter-bar, showing the cushion for the same. Fig. 9 is a detail of the tripping device, showing the tripping end of the tripping-rod in an actuating position. Fig. 10 is a top view and partial section of a part of the tripping device, showing the tripping-pawl-lever carrier mounted on its bearing. Fig. 11 is a side view of the tripping device after it has been actuated by the pawl-carrier and tripped the cutter. Fig. 12 is a top view of the mechanism shown in Fig. 10 after the cutter has been tripped. Fig. 13 is a top view of the cutter-carrier holding-lever, retaining-rod, and tripping-pawl before the cutter has been tripped; and Fig. 14 is a similar view after the cutter has been tripped. Fig. 15 is a vertical section on the plane of the line 15 15 in Fig. 3. Fig. 16 is a face view of the gear-wheel $4^n$. Fig. 17 is an end view of the cam placed next to this gear-wheel looking from left to right; and Fig. 18 is a side view, looking from right to left, of the ratchet-wheel which actuates this cam. Fig. 19 is a vertical section on the plane of the lines 19 19 in Figs. 1 and 2 looking from left to right. Fig. 20 is a detail top view of the work-clamp in its normal position, and Fig. 21 is a side view of the same. Fig. 22 is a side view of the extending end of the work-clamp spring and the cloth-presser attached thereto. Fig. 23 is a face view of the cloth-presser. Fig. 24 is a detail view of the trip mechanism in the locked position, and Fig. 25 is a similar view of the same after its actuation. Fig. 26 is a side view of the stop-pawl for the work-clamp-feed ratchet-wheel. Fig. 27 is a detailed plan view of the cloth-plate. Fig. 28 is a detail sectional view of one of the tension devices. Fig. 29 is a detail elevation of the eccentric adjustment on the under shaft of the machine. Fig. 30 is a diagrammatic view of the buttonhole-stitches enlarged and separated. Fig. 31 shows a normal-size buttonhole made on the machine. Fig. 32 is a detailed sectional view of the segmental lever, showing the jaws between which the eccentric works. Fig. 33 is a top view showing the inclined face of the lever $10^e$. Fig. 34 shows the position of the lever I during the stitching of one side of a buttonhole; Fig. 35, its position during the stitching of the other side, and Fig. 36 its central position when barring-stitches are made.

In the drawings, A represents the arm of the machine, a its bed, and C its undershaft. $a''$ is a pivoted gate, and N is the needle-bar mounted therein. All of these parts are of ordinary construction and need no further or particular description, and it is understood that the machine is provided with the usual parts not particularly described. Any understitching mechanism adapted to engage the needle-thread loop of a vertically-reciprocating and laterally-vibrating needle is adapted to and can be used in combination with my mechanisms.

I will first describe the mechanism for imparting the lateral movements to the needle-bar.

In the present form of my invention I use a usual construction of a vertically-reciprocating needle-bar mounted in a pivoted gate or frame. For vibrating or swinging the needle-bar gate I use a lever which is fulcrumed on an eccentric. The upper end of the lever is connected to the needle-bar gate by means of a usual rod or link, and the lower end is adapted to be engaged by a switch-cam which is mounted on the upper shaft of the machine. Two distinct classes of movements are imparted to this lever from two distinct sources. One of these is the switch-cam, which engages the lower end of the lever in a usual manner and imparts to it, and through it to the needle-bar gate, the usual vibratory lateral movements, which in turn produce, in combination with the complemental stitch-forming mechanism, the ordinary depth and edge stitches of the sides of the buttonhole. The other class of movements is immediately derived from the eccentric, on which it is fulcrumed, and which in turn is actuated by a cam. The movement of the eccentric is intermittent, and when it takes place the lever is transformed into a kind of compound lever having a second fulcrum at its cam-engaging end.

1 represents the lever last mentioned, the lower end of which is in engagement with a switch-cam $1^b$, secured to the upper shaft $1^c$ of the machine and through which it is vibrated in the usual manner. This lever 1 is pivoted on an eccentric 6, rigidly secured to the end of a transverse shaft $1^a$, suitably adapted to oscillate on the arm of the machine. The eccentric is so mounted that the center of its action is vertically above the center of the shaft $1^a$. In the upper end of the lever 1 is a seat $1^d$, in which a sliding shoe $1^e$ is mounted. A link $1^f$ is connected at one end to this shoe and at the other end to the needle-bar gate. I use for manually adjusting the extent of the lateral movement of the needle-bar the lever 1, provided on its face with a slotted plate $1^g$, serving to retain the sliding shoe $1^e$ in place. Depending from the lever end of the link $1^f$ is a link 2, made adjustable in the direction of its length by being made in two pieces longitudinally movable with respect to each other and provided with means for fastening them together after adjustment. Such adjustment will vary the position of the lever end of the link $1^f$ with respect to the fulcrum of the lever 1 and will correspondingly vary the length or depth of the individual overseam-stitches. It is obvious that if the eccentric 6 is held from turning the movement imparted by the switch-cam $1^b$ to the lever 1 and through its link connection $1^f$ to the needle-bar will be the same as in ordinary overseaming-machines.

I provide means for automatically varying the depth of the overseam-stitches, consisting of the link 2, adjustably secured at its lower end to a curved arm $2^a$, which in turn is mounted on one end of a transverse shaft $2^b$, mounted on the arm of the machine and adapted to oscillate. It is obvious that any change in the vertical position of the link 2 brought about by the oscillation of the arm $2^a$ will correspondingly change the position of the lever end of the link $1^f$ with respect to that of the fulcrum of the lever 1 and vary the extent of the longitudinal movement of the link $1^f$, and thereby alter the extent of the overseam-stitches. The extent of the change of the position on the arm $2^a$ of the lower end of the link 2 serves to regulate the extent of the automatic change, in the lateral vibration of the needle, and consequently the extent of the overseam-stitches.

The means provided for oscillating the shaft $2^b$ are as follows: On the rear end of the shaft $2^b$ is rigidly mounted a lever $2^c$, provided at one end with a friction-roller $2^d$, mounted on a stud. A cam-lever 3, mounted on suitable bearings on the arm of the machine, engages with the friction-roller $2^d$ and is itself actuated by the lever 4 through the link $3^a$, with which it is connected. On the lower end of this lever 4 is a friction-roller 6*, which is engaged by a cam $4^a$, the groove of which is constructed with centrally-located straight parts 1* and 2*, which are exactly opposite each other on the cam and straight parts 3* and 4*, which are located on opposite sides of the cam and near the opposite edges of the same. The centers of these straight parts of the groove are each exactly one-quarter distance around the cam. The parts 1* and 2* are considerably longer than the parts 3* and 4*, the object of which will be explained latter on. Inclined grooved portions 5*, 8*, 9*, and 10* connect with the grooved straight portions, and thereby form a complete groove around the cam. These inclined portions are all of the same length and the inclines are of the same angularity.

The shaft $1^a$ is oscillated on its axis through the curved slotted arm 5, which is rigidly secured to it at its upper end and to which an oscillatory motion is imparted by the lever 4 through the link $24^a$, which is operatively secured to the lever 4 at one end and adjustably secured to the arm 5 at the other end by means of a sliding shoe held in a slot on the arm. As I have already said, the shaft $1^a$ is provided at its outer extremity with an eccentrically-mounted cylindrical head 6, the axis of which is above the axis of the shaft sufficiently to give the required lateral movement to the lever 1. On the eccentric 6 the lever 1 is fulcrumed and adapted to turn. Therefore when the shaft $1^a$ is oscillated the eccentricity of its head causes the lever to move to the right or left, as the case may be, and thus changes its working position laterally, and the relations with respect to each other of the movements of this lever are such that when an increase is made in the extent of the overseam-stitch such increase takes place away from the center line of the buttonhole, which is clearly shown in Figs. 34, 35, and 36.

To one end of the cam $4^a$ is adjustably attached a ratchet-wheel $4^b$, having spaces $4^c$ and $4^d$ in its periphery devoid of teeth, and provided with slots $4^e$, by which its adjustment is effected. On the hub $4^f$ alongside of the ratchet-wheel is mounted a pawl-lever $4^g$, carrying a pawl $4^h$, adapted to engage the teeth of the ratchet-wheel. Connected with the pawl-lever $4^g$ and mounted on the same stud is an arm $4^i$, terminating in a strap $4^j$, encircling an eccentric $4^k$, adjustably mounted on a carrier $4^l$, which in turn is mounted and fastened on the under shaft C of the machine. On the other end of the cam $4^a$ is a projection $4^m$. To the left of the cam $4^a$ is a gear-wheel $4^n$, mounted on a shaft $4^p$, a projection $4^q$ on the side of the gear-wheel being adapted to engage the similar projection $4^m$ on the side of the cam $4^a$. On the rear end of the shaft $4^p$ is mounted and secured a ratchet feed-wheel 7 and a pawl-lever $7^a$, carrying a pawl $7^b$, which actuates the ratchet feed-wheel. One end of a link $7^c$ is connected with the pawl-lever $7^a$ at its lower end, and the other end of the link is secured to a shoe in a seat $7^d$ on the segment-lever $7^e$, mounted to oscillate on a bearing on the base of the machine. An eccentric $7^f$ on the end of the shaft C engages the segment-lever $7^e$ between jaws $7^*$, which are fastened on the back of said lever.

An ordinary tension 9 produces a tension on the thread during the entire stitching of the buttonhole. A second ordinary tension $9^a$ produces a tension on the thread during the stitching of the sides of the holes and is then disengaged from the thread by the following mechanism: An ordinary releasing-rod $9^b$, running through the center of the hub $9^c$, on which the tension-disks $9^d$ and $9^e$ are mounted, engages a plate $9^f$, which in turn disengages the tension-spring $9^g$ from the disk $9^e$. An inclined face $9^h$ on the end of a lever $9^i$, pivoted on a stud on the head of the machine, is adapted to engage the free end of the tension-releasing rod $9^b$. The needle-bar-actuating mechanism through the link $2^e$, connecting the lever $2^c$ with the lever $9^i$, actuates the latter and brings the cam $9^h$ on the end of the same into engagement with the tension-releasing rod $9^b$ when the movement of the needle-bar for forming a tack at the end of a buttonhole commences.

I have now specified the mechanism which increases and decreases the extent of the lateral vibrations of the needle, moves laterally the working position of the same, and increases and decreases the amount of the tension on the thread. It is seen that the cam $4^a$ is the primary source of all these movements and that all the actuating movements of this cam are transmitted to the various parts through the lever 4. I shall now describe the work-clamp.

A flat spring 8, loosely hinged on a bearing $8^a$, forms the upper member of the work-clamp. The spring 8 is bifurcated at its outer end to form two extensions $8^b$, through which and through two springs $8^d$, underneath the same, loosely pass two bolts $8^c$ into seats into two longitudinal shoes $8^e$, which are provided with longitudinal slots $8^f$ at their outer extremities and adapted to receive tongues $8^g$, attached to the inner ends of two supplementary transverse shoes $8^h$, which are secured to the outer extremities of the springs $8^d$. Passing through the extension $8^b$ and with a seat on the same are four screws $8^i$, adapted to press down upon the springs $8^d$. A thumb-screw $8^j$ serves to increase or decrease the downward pressure of the spring 8. A slide $8^k$, provided with transverse jaws $8^l$ on its under side, terminating at its outer extremity in a cloth-plate $8^m$ and provided with a depressed and recessed bearing $8^n$, forms the lower member of the work-clamp, which is adapted to reciprocate in proper bearings on the bed-plate of the machine. A cam D, adjustably mounted on a disk $d$, which in turn is mounted on the end of a suitably-mounted upright shaft $d'$, is adapted to engage the work-carrier R between the jaws $8^l$ of the lower member of the same. A beveled gear-wheel $d''$ on the shaft $d'$ meshes with a beveled gear $d'''$ on the shaft E, which is mounted in suitable bearings on the bed-plate of the machine. A gear $e$, mounted on the other end of the shaft E and meshing with the gear $4^n$, connects it with the shaft F. The beveled gear $d'''$ is secured to the shaft E by means of a usual set-screw, as shown in Fig. 4. By loosening the set-screw the gear can of course be adjusted circularly on the shaft and also longitudinally on the shaft. The cam D is so formed that the rotation of the same produces a uniformly-reciprocating movement of the work-carrier and in this machine is preferably constructed to produce such a movement when off the center, so as to stitch a buttonhole from one-half an inch to one and one-quarter inches. It can be made adjustable off the center by any ordinary means—for instance, by means of the slot and keyway shown in Fig. 3 and the screw $d^*$ therein shown for holding the same securely in place. This cam can of course be formed to produce a dwell at the end of the hole, if it is so desired. A way $r^*$, formed through the members 8 and $8^k$, serves as a means for reaching a screw $d^*$ with a screw-driver, and thereby adjusting the cam D without removing any parts of the machine. When the machine stops at the finishing of a buttonhole, the guideway $a^*$ in the disk $d$ is in a position longitudinally of the work-clamp and the cam D is off the center toward the rear end of the said work-carrier. This arrangement of the work-carrier and its actuating-cam makes it very convenient to adjust the latter. For example, the screw $d^*$ can be loosened by means of a screw-driver, and then by pushing the work-clamp from the operator the cam D will be moved more from the center of the disk $d$, or by moving the work-carrier toward the operator the said cam will be moved toward the center of the disk $d$ and when in the desired position secured by again tightening the screw $d^*$. Thus it is seen that the operator can tell by the position of the work-clamp just what size buttonhole will be made.

The stop-motion mechanism is as follows: A wheel G is rigidly secured on the upper shaft of the machine, a second wheel H, loosely mounted on the shaft alongside of the same, being adapted to clutch and turn the rigidly-mounted wheel, all of which is of ordinary construction. A friction-strap 10, consisting of a flat spring lined with a frictional substance, like cloth or leather, is fastened at one end to the springs $10^a$, which in turn are secured to a bracket $10^b$, attached to the arm of the machine. The upper and middle part of this strap is connected with a coiled spring $10^c$, which in turn is adjustably secured to a standard $10^d$ on the arm of the machine. The other end of the strap is adjustably secured to a lever $10^e$, pivoted on a stud $10^f$ on the arm of the machine. The upper end of the lever is formed with an incline $10^g$, so that when the lever is turned in the direction of the arrow the upper face $10^h$ pushes a projecting stud $h$ on the wheel H, causing contact between the wheels G and H. A coiled spring $10^j$, secured at one end to the lower end of the lever $10^e$ and at its other end to a rod $10^k$, adjustably mounted in a standard $10^l$ on the bed-plate of the machine, has a normal tendency to draw the lever $10^e$ out of engagement with the wheel G. A catch 12 is attached to the lower end of the lever $10^e$, a latch $12^a$ being adapted to hold the catch, and through it the lever $10^e$, in its normal position of holding the loose wheel H in contact with the rigid wheel G. On the inner surface of the feed-wheel 7 is pivoted a lever $7^g$, which is yieldingly held in an upright position by means of a coiled spring $7^h$, also secured in a slot $7^j$ in the side of the feed-wheel, the pin connecting the spring to the lever serving as a stop to limit its motion by being brought into contact with the sides of the slot as the lever turns on its pivot. As the feed-wheel 7 is rotated in the direction of the arrow (the lever $7^g$ rotating with it) its free end is brought to bear upward against the latch $12^a$, as shown in Fig. 24. The pressure against the latch being continued by the rotation of the wheel, the lever $7^g$ turns on its pivot until the pin connecting it with the coiled spring $7^h$ is brought to bear against the end of the slot, when the further turning of the lever being stopped it lifts the latch $12^a$ until it is out of the notch $12^c$, and thereby allows the spring $10^j$ to actuate the lever $10^e$, and thereby release the wheel H from its engagement with the wheel G and to bring the friction-strap 10 into action against the face of the wheel G and thus stop the machine. The spring $7^h$ returns the lever $7^g$ to its normal position after it has tripped the latch of the stop-motion.

Extending from the hub of the lever $10^e$ is an arm $10^m$, to which is attached a dependent chain $10^n$, the lower end of which is secured to a lever $10^p$, pivoted to a bracket $10^q$ on the under surface of the machine-table. An upward motion communicated to the lever $10^p$ by the operator pulls the chain $10^n$ downward and turns the lever $10^e$ until its inclined face $10^h$ is against the loose wheel H, pressing it into engagement with the wheel G and thus starting the machine.

The use of the arrangement just described is especially convenient, for the lever $10^p$ can most readily be pressed upward by the knee of the operator, an adjustable footstool K being provided for operators of varying stature.

The feed-wheel 7, as I have said, has a number of teeth omitted from its periphery, as shown at $7^w$, and a toothed sector $7^m$, adjustably secured thereto, is adapted to give any predetermined distance between the last tooth $x''''$ on the wheel 7 and the first tooth $y$ on the sector or to entirely close the space $7^w$. To explain the effect of the gap $7^w$ and the sector $7^m$, suppose, for instance, that the pawl is set to feed the distance between two teeth at a stroke. The sector $7^m$ is then so set that the distance between the tooth $y$ and the tooth on the ratchet-wheel $x''''$ is the distance between two teeth—viz., equivalent to the length of a stroke. If it should happen from any cause that the pawl was engaging the wrong tooth—say $x''$ instead of $x'''$ or $x'$ on the sector—it would pass over the tooth $y$ into the gap $7^w$ and returning would engage the tooth $y$ and feed the wheel the distance of one tooth only. At its next stroke it would engage the tooth $x''''$, and thus be in engagement with the proper teeth again. Of course it is necessary that the feed-pawl $7^b$ should be wide enough to engage with the teeth on the sector $7^m$, as well as those on the wheel 7.

At the rear of the feed-wheel 7 is mounted a pawl-stop $7^s$ on an eccentric $7^q$ and adapted to turn on the same. The eccentric is mounted on a stud $7^r$, which in turn is mounted on the bed of the machine. The eccentric $7^q$ is provided with a projecting arm $7^t$, by means of which it can readily be adjusted. Any usual screw having a seat in the end of the stud $7^r$ will serve as a means for holding the eccentric in place, the latter being made so that it extends slightly above the end of the stud $r$, so the head of the screw will come into contact with the eccentric. The advantage of this construction is that by turning the eccentric the position of the engaging end of the pawl in relation to the stroke of the actuating-pawl may be changed.

The cutter and its actuating mechanism are as follows: The cutter-carrier 13 is mounted in the usual bearings in which a presser-bar is commonly mounted, a suitable cushion $13^a$, as shown in Fig. 8, being provided to receive the downward blow of the carrier when depressed. The depressor $13^b$ for the carrier can be an ordinary coiled spring, such as is commonly used to depress the presser-bars in the ordinary overseam-machine. The carrier is provided near its lower extremity, but above the knife, which is mounted in the ordinary manner, with a laterally-projecting bearing $13^c$, adapted to rest when the knife is raised against the front end $13^d$ of a movable holder $13^e$, which is a horizontal lever mounted in suitable bearings $13^f$ on the head of the machine. The holder is provided at its rear end $13^g$ and on its upper surface with a tooth $13^h$, adapted to engage with and be actuated by a pawl $13^j$, horizontally pivoted on the lower horizontal member $13^k$ of a compound lever $13^l$, adapted to turn on its vertical member $13^m$, suitably pivoted on the head of the machine and provided with an upper horizontal member $13^n$, provided at its outer extremity with a fork $13^p$ and actuated in a manner presently to be described. The holder $13^e$ is provided with a spring $13^q$, secured to a bracket on the head of the machine and adapted to retract it to its normal position after it has been actuated by the pawl $13^j$. The pawl $13^j$ is provided with a projecting piece $13^r$, adapted to engage with the projecting bearing $13^c$, which moves the pawl out of engagement with the tooth $13^h$ on the holder as the knife decends. It is also provided with a cam $13^s$, adapted to engage with a curved projection $13^t$ on the rear end $13^g$ of the holder and by the action of which the pawl is returned to its normal or engaging position as the knife is raised. The pawl is held securely against the under surface of the lever $13^l$ by means of a coiled spring $13^u$, adapted to produce sufficient friction to prevent undesirable movement of the pawl. A vertical cam-rod 14 is pivoted at its upper end to a horizontal lever $14^a$, which reciprocates it, and its lower end is bent at $14^b$ to form a cam. Intermediately it passes through a bracket-guide $14^c$ on the head of the machine. The cam $14^b$ as the rod 14 is moved downward, pressing against the fork $13^p$ in the upper member $13^n$ of the lever $13^l$, causes the lever to move on its fulcrum. This motion being communicated through the lever $13^l$ to the pawl $13^j$ moves the latter to actuate the lever end of the cutter-carrier holder $13^e$ away from the bearing $13^c$ on the cutter-carrier and permits the depressor-spring to act and drive down the knife. The cam-rod 14 is reciprocated by the lever $14^a$, which is fulcrumed on the shaft $1^a$. At its opposite end the lever $14^a$ is connected to a link $14^b$, which in turn is connected to the latch $12^a$ of the stop-motion, whereby when the latch is lifted through the operation of the cam $12^d$ on the catch 12 the link $14^b$ is moved upward, and its motion, as I have stated, is imparted to the cutter-carrier holder. It will be noted that the lifting of the latch $12^a$ out of the notch $12^c$ by the action of the feed-wheel 7 has no operative effect on the cutter-tripping device, but that the cutter-tripping mechanism is acted upon during the action of the cam $12^d$. This secures the result that the stopping mechanism begins to act at the beginning of the stoke of the actuating-pawl and that the cutter-tripping device is set into action after the stroke of the actuating-pawl has been finished, so that the goods are at rest when the knife reaches them.

It will be observed that the cutter-carrier is provided with an upwardly-extending and adjustably-secured rod $13^v$, bent at $13^w$ so as to project over the end of the lever $14^a$. When, therefore, the cutter is in a depressed position, the end of the lever $14^a$ is prevented from being returned to its normal position until the knife is raised. In other words, the stop-motion cannot be returned to its normal position or the machine started until the knife is out of the goods and returned to its elevated position. After the cutter-carrier has been elevated the lever $14^a$ is returned to its normal position through the retraction of the spring $14^d$ after the stop-motion is released.

I provide for the cutter an auxiliary adjustable holder 15, mounted to reciprocate in a bracket $15^a$, adjustably mounted on the head of the machines. The forward end of the holder 15 is adapted to fit into an aperture $15^b$ in the laterally-projecting bearing $13^c$ of the cutter-carrier. The holder is provided with a stop-lug $15^c$, acting against a flange $15^d$ on the bracket $15^a$ to limit the forward movement of the holder. A coiled spring $15^e$, surrounding the holder and impinging against a flange $15^f$ on the bracket $15^a$, tends to push the holder forward. The forward end of the spring impinges against the stop-lug $15^c$. The holder 15 is provided with a stop-lug $15^g$, which when the holder is so turned as to permit the lug to strike the flange $15^f$ limits the forward movement of the holder and keeps it out of engagement with the aperture $15^b$. A longitudinal recess in the bracket $15^f$ above the holder-way permits the passage of the stop-lug $15^g$ when the holder is turned so that the stop-lug is uppermost. The same recess prevents any undesirable turning of the holder. At the rear end of the holder is secured a projecting piece $15^h$, longitudinally adjustable on the holder-rod 15 and which is adapted to be engaged by a vertical stud 15$^j$, suitably mounted on the work-carrier. These parts are so arranged that when the carrier is at such a point that the needle is finishing the buttonhole the holder 15 is disengaged from the cutter-carrier and permits the descent of the knife at the proper time.

It will be observed that there is applied to the feeding mechanism for regulating the lateral movement of the needle-bar in the making of the barring and the changing of the lateral working position of the needle-bar the device designated as 16 in the drawings for governing the feeding mechanism patented to me in United States Letters Patent No. 582,225. Similarly I employ another form of this device (designated as 16$^a$ in the drawings) to govern the movements of the work-clamp feed-wheel. This friction device is formed of one piece, which nearly encompasses the shaft F, having two extending ends 16*, through which a screw 17* passes, said screw serving as a means for increasing and decreasing the friction on the shaft F. To the upper end of one of the extending ends is attached one end of a spring 18*, the other end of which is attached to a fixed part of the machine. The spring 18* draws on the extending ends in the opposite direction to the rotation of the feed-wheel 7. The contact-surface of this friction device with the shaft F is preferably provided with leather. These friction devices are in principle practically the same as used by me in the above patent, No. 582,225, and form no part of my present invention.

The following means are provided for opening the work-clamp, returning the cutter to its normal position, and releasing the tension 9. The lever 17 is pivoted on a stud 17$^a$, which has a seat on the arm of the machine. A spring 17$^b$ is suitably mounted to normally hold the lever 17 in the position shown in Fig. 2. The forward end 17$^c$ of the lever 17 is formed so as to extend in front of the face-plate of the machine, as shown in Fig. 5. A screw 17$^d$ passes through the forward end of said lever and is adapted to engage the tension-release lever 17$^e$. A spring 17$^f$, if mounted on the lever 17$^e$, is adapted to be engaged by a stud 17$^g$, mounted on the needle-bar N during the downward movement of the same. Returning to the lever 17, it is seen that a stud 17$^h$ projects from near its forward end, a rod 17$^i$, the upper end of which is threaded, passing loosely through said stud. On said threaded end is a nut 17$^j$, which is suitably held in position by a jam-nut 17$^k$. The lower end of this rod 17$^i$ is loosely connected with the upper member 8 of the cloth-carrier. This nut 17$^j$ is adjusted on the rod 17$^i$ so that when the forward end of the lever 17 is raised the engagement between the nut 17$^j$ and the stud 17$^h$ lifts the rod sufficiently to open the work-clamp. A downwardly-projecting arm 17$^l$ on the forward part of the lever 17 is provided with an inwardly-projecting shelf 17$^m$. An arm 17$^n$, mounted on the cutter-carrier, extends rearwardly through a suitable opening in the head of the machine, and on the extended end of this arm is a stud on which a friction-roller 17$^o$ is mounted and adapted to rest on the shelf 17$^m$. A rod 17$^p$, dependent from the rear end of the lever 17, is provided with a chain 17$^q$, extending downward to a foot-lever 17$^r$, suitably attached thereto. It is evident that one downward actuating movement of the foot-lever 17$^r$ will exert a pull upon the chain 17$^q$, which in turn will cause the rear end of the lever 17 to be depressed and the front to be elevated. This latter movement being communicated to the rod 17$^c$ will operate to lift the upper member 8 of the work-clamp. At the same time it raises the cutter through its engagement with the arm 17$^n$ of the cutter-bar, and, furthermore, by means of its action upon the tension-releasing lever 17$^e$ it releases the tension 9.

It will be observed that the feed is stopped during the tacking at the finishing end of the buttonhole and that during such tacking the tension 9$^a$ is released through the action of the lever 9$^l$ and its cam 9$^h$. Thus the upper thread is practically free from any tension during the time that the work is being moved along or changed for the making of the next buttonhole, and this freedom from tension continues until after the needle has commenced to descend. The advantage of this is that no slack thread in commencing to stitch a buttonhole has to be pulled through the tensions by the operator to prevent its breaking.

To return to the ratchet-wheel 4$^b$, it may be observed that when its actuating-pawl 4$^h$ reaches the spaces 4$^d$ and 4$^e$ (shown in detail in Fig. 18) the wheel comes to a rest and remains so until turned into engagement with its actuating-pawl 4$^h$. The eccentric 4$^k$ is adjusted so as to actuate the pawl 4$^h$ a sufficient extent to produce the number of strokes in passing from the gap 4$^e$ to the gap 4$^d$ required during the stitching at one end of the buttonhole. The pawl is so set that in passing over the distance between the gaps 4$^e$ and 4$^d$ it will feed at any one stroke through such a number of teeth that its total strokes will bring the pawl over the entire distance. It is of course understood that the movement of the ratchet-wheel 4$^b$ is always much faster than that of the feed-wheel 7, as this latter wheel has to feed during the stitching of the entire buttonhole, while the former has only to feed during the making of the barring-stitches. The cam 4$^a$ is constructed, as is shown in Fig. 2, so as to dwell in its action on the lever 4. This dwell occurs during the entire period for making the barring-stitches at the ends of the holes, and of course the speed of the wheel 4$^b$ determines the number of stitches that will be made in the bar.

In the operation of the machine I preferably adjust the extent of the stroke of the pawl 4$^h$ so that the cam 4$^a$ is moved, through the action of two strokes of the said pawl, the distance of one of the inclines in the groove of the cam. The cam $4^a$ is so timed relative to the gaps in the teeth of the ratchet-wheel $4^b$ that the roller $6^*$ is just at the beginning of the inclines in the groove of the cam when the pawl $4^h$ commences a forward movement. Assuming that the cam $4^a$ is in the position shown in Fig. 2, the roller on the lower end of the lever 4 in the position therein shown, and the other parts properly adjusted, the operation of the machine in completing a buttonhole will be as follows: First, during the turning of the cam $4^a$ until the roller $6^*$ reaches the incline $9^*$ long barring-stitches will be made across the first end of the buttonhole by reason of the said roller being in a central portion of the cam and the end of the connection $1^f$ being enough above the pivot of the lever 1 to form such stitches, the adjustment of the length of the link 2 determining the length of the stitches, and second, on further movement of the cam the incline $9^*$ engages the roller $6^*$, and through it moves the lower end of the lever 4 toward the rear end of the machine until the portion $3^*$ is reached, when such movement stops and the movement of the cam also stops by reason of the gap $4^c$ in the teeth of the ratchet-wheel having reached the actuating-pawl $4^h$. This movement of the lower end of the lever 4 toward the rear of the machine moves the working position of the needle-bar also toward the rear end of the machine and the end of the connection $1^f$ down on the lever 1. (See Figs. 1 and 2.) During the engagement of the first part of the movement of the incline $9^*$ with the roller $6^*$ induced by the action of the pawl $4^h$ the needle-bar is moved toward the rear end of the machine through the action of the usual switch-cam, which is in engagement with the lower end of the lever 1, and the end of the connection $1^f$ is moved down on the lever 1 at the same time through the action of the cam-lever 3 and the connections between the same and the connection $1^f$. These movements are so proportioned relative to each other that the action of the mechanism which moves the working position of the needle-bar laterally is offset by the movement of the end of the connection $1^f$ down on the lever 1, and consequently the needle descends in the same place it would have descended if the working position of the same had not been changed, which place is at the end of the bar on the side of the buttonhole about to be stitched. The engagement between the incline $9^*$ and the roller $6^*$ induced by the second stroke of the pawl $4^h$ again moves the lower end of the lever 4 toward the rear end of the machine and through the connections between the upper end of the said lever and the needle-bar again moves the working position of the needle-bar toward the rear end of the machine and the end of the connection $1^f$ farther down on the said lever 1. These movements reduce the extent of the lateral vibration of the needle to that which is used in stitching the sides of the buttonhole, and the needle descends in line with the edge stitches of the first side of the hole. Thus it is seen a change from long barring-stitches to the short stitches for the first side of the hole has taken place without there being any intermediate short or mongrel stitches in the bar. The roller $6^*$ now being in the portion $3^*$ of the cam and the gaps $4^c$ in the ratchet-wheel $4^b$ under the actuating-pawl $4^h$ the cam $4^a$ remains at rest until one side of the buttonhole has been stitched. During the tacking of the end of the hole the part $4^m$ on the cam $4^a$ moves away from the part $4^q$ on the gear $4^n$, the speed of this movement being determined by the extent of the stroke of the pawl $7^b$ in engagement with the ratchet-wheel 7. During the stitching of the side of the buttonhole the part $4^q$ moves toward the part $4^m$ and engages with said part just before the end of the hole is reached, and thereby turns the cam $4^a$, and through it the ratchet $4^b$, until the pawl $4^h$ engages the teeth on the opposite side of the gap $4^c$. This movement of the part $4^q$, which brings the incline $10^*$ up to the roller $6^*$ and then the pawl $4^h$ into engagement with the teeth of the ratchet-wheel $4^b$, is produced through the movement of the ratchet 7 and the connection between it and the gear $4^n$. The gaps in the ratchet-wheel $4^b$ are of a greater extent than the longest stroke of the pawl $4^h$, and the portions $3^*$ and $4^*$ are of such an extent that the roller $6^*$ just reaches an incline at the end of one of the said portions as the pawl $4^h$ crosses one of the gaps and engages with the teeth of the ratchet-wheel. The first engagement of the pawl with the teeth of the ratchet-wheel $4^b$ after crossing the gap $4^c$ engages the incline $10^\times$ of the cam with the roller $6^*$, and thereby moves the lower end of the lever 4 toward the forward end of the machine and through it, as it is understood, the working position of the needle-bar in the same direction and the end of the connection $1^f$ upon the lever 1. As this movement takes place the lower end of the lever 1 is moved toward the forward end of the machine through the action of the usual switch-cam, and through such action the needle-bar is moved toward the rear end of the machine, the movement of the end of the connection $1^f$ upon the lever 1 neutralizing the effect of the movement of the working position of the needle-bar toward the forward end of the machine. Thus it is seen the needle descends in line with the depth-stitches the same as if no change had been made in the movement of the working position of the needle-bar. The second engagement of the pawl with the teeth of the ratchet-wheel $4^b$ during the engagement between the portion $10^*$ with the roller $6^*$ turns the portion $1^*$ into engagement with the roller $6^*$. During this second engagement the lower end of the lever 1 is moved toward the rear end of the machine, and through this movement the needle-bar is moved toward the forward end of the machine at the same time that the working position of the needle-bar moves in this direction, and thus the entire end of the buttonhole is crossed by a long barring or tacking stitch. The machine continues to make these stitches during the engagement between the portion 1* and the roller 6*, which engagement through the adjustment of the pawl 4$^h$ preferably continues during the formation of nine long barring-stitches across the end of the buttonhole, which finishes the tack with the needle on the opposite side of the said buttonhole with respect to the first side of the hole stitched. During the stitching of the first side of the buttonhole the cam D is turned so as to move the work toward the operator, which movement has now taken place in the stitching of the buttonhole so far as described, and the work-clamp through the action of said cam has commenced to move from the operator, said clamp having been in its extreme position toward the operator when one-half of the tack at the end of the hole had been completed. The end of the portion 1* of the cam 4$^a$ just reaches the roller 6* of the lever 4 as the eighth stitch across the end of the buttonhole is completed. During the movement of the needle-bar through the action of the lever 1 toward the forward end of the machine preparatory to making the ninth stitch across the end of the buttonhole the incline 5* engages the roller 6* and through it moves the working position of the needle-bar also toward the forward end of the machine and at the same time the end of the connection 1$^f$ down on the lever 1. This movement of the end of the connection 1$^f$ down on the lever 1, as before explained, offsets the movement of the working position of the needle-bar, and the needle descends at the end of the tack or bar. The next engagement between the incline 5* of the cam and the roller 6* of the lever 4 moves the working position of the needle-bar still farther toward the forward end of the machine and at the same time the end of the connection 1$^f$, as before, down on the lever 1. Thus the extent of the vibratory movement of the needle is returned to what it was during the stitching of the other side of the hole, and therefore the needle descends in line with the edge stitches of the second side of the hole and completes an edge stitch. The gap 4$^d$ of the ratchet-wheel having now come under the actuating-pawl 4$^h$ and the portion 4* of the cam into engagement with the roller 6*, the cam and ratchet again remain at rest until the stitching of the second side of the buttonhole is nearly completed, when the part 4$^q$ of the gear-wheel again engages 4$^m$ of the cam and through it again turns the cam 4$^b$ until the portion 8* reaches the roller 6* and the first tooth on the opposite side of the gap 4$^d$ of the ratchet-wheel comes into engagement with the pawl 4$^h$. The first engaging stroke of the said pawl with the said ratchet-wheel now causes the first part of the incline 8* to engage the roller 6*, which engagement moves the working position of the needle toward the rear end of the machine and the connection 1$^f$ upon the lever 1, and at the same time the needle-bar is being moved toward the forward end of the machine through the action of the lever 1. The needle, as before, descends at the end of the tack the same as if no movement had been made in its working position. The next movement of the pawl 4$^h$ moves the working position of the needle-bar again to the right at the same time the lever 1 moves it to the right, and the movement of the connection 1$^f$ upon said lever increases the extent of the movement through said lever. These combined movements, as before at the other end of the buttonhole, cause the needle to cross the entire end of the hole and descend at the end of the tack or bar. The portion 2* of the cam being again in engagement with the roller 6*, tacking or barring stitches are again made at the first end of the buttonhole and mostly on top of those previously made. The engagement between the portion 2* and the roller 6* continues until the roller is in or near the center of said portion, when the stop-motion is tripped, the machine stopped, and the automatic cutter actuated. During the tacking of one end of the buttonhole the portions 10*, 1*, and 5* engage the roller 6*, and during this time the cam turns nearly one-half around and the part 4$^m$ turns ahead of the part 4$^q$ nearly this amount. The movements of the cam through the portions for tacking one end of the buttonhole are all produced by the ratchet-wheel 4$^b$, and the cam D is timed (through adjusting the gear $d'''$ around on the shaft E) relative to said movements, so that the bar or tack is made square across the end of the hole. The gear 4$^n$ is timed (by adjusting the same around on the shaft F) relative to the engagement between the part 4$^q$ on the said gear and the part 4$^m$ on the cam 4$^a$ so the stop-motion will be tripped into action at the proper time during the finishing of the finishing end of the buttonhole.

Referring again to the lever 1, it is noted that through one adjustment of screw 19*, which connects the two parts of the link 2, the length of the barring or tacking stitches, the length of the overseaming-stitches on the sides of the buttonhole, and the space between the rows of said overseaming-stitches along the sides of the hole can be all proportionally increased or decreased. The advantage of this can be readily understood. For example, if longer individual overseaming-stitches are wanted along the sides of the holes by the one adjustment of the end of the connection 1$^f$ upon the lever 1, which adjustment is accomplished by lengthening the connection 2 through the adjusting-screw 19*, this is accomplished, for the reason that this adjustment increases the stitches out from the center and proportionally increases the barring or tacking stitches, and vice versa when shorter stitches are wanted.

Referring again to the stop-motion device, it is noted that the adjustment of the tension of the spring $10^j$ governs the speed of the action of the same. For example, if the rod $10^k$ is so adjusted that the spring $10^j$ is under a heavy strain the lever $10^e$, and through it the strap 10, will be closed at a higher rate of speed, and consequently the machine will be stopped sooner after the tripping of the stop-motion than it would be with said spring under a light strain. This is very advantageous, as the stop-motion can be adjusted instantly to stop the machine with the take-up at its extreme upper position or in any given position.

The movements of the feed-wheel which moves the work in the ordinary buttonhole-machine are too slow for producing the movements required for properly making the barring-stitches at the ends of the same, or, in other words, for having the barring-stitches all one length across the ends of the holes. When the movement is slow in changing from one side of the hole to the other, there are a series of short and long barring-stitches formed, the needle sometimes going down in the same hole the second time and sometimes going down through the barring-stitches already made, causing the thread to fray and break and producing a sort of a lump for a bar. This trouble is aggravated if a pearl-stitch buttonhole is being made.

Some of the advantages in using my invention are as follows:

In my machine, as the work-carrier is reciprocated and has no lateral movement, it will always present the work to the needle so as to form absolutely-straight buttonholes no matter at what speed the machine is run. This movement causes the cutter to cut the hole absolutely clean after it has been stitched, so that its inner sides show the thread only, as when the hole is cut before it is stitched. This movement is not only much better when the hole is cut after the stitching, but is much better if it is desired to cut the hole before the stitching. The work-clamp having no lateral movement, it is seen that an ordinary presser-foot can be used to hold the work down around the needle. Of course a slit for the passage of the knife at the rear of the foot would have to be made and a proper bearing also for the presser-bar. This is so evident that it is not thought necessary to illustrate it.

The machinery for producing the lateral stitches, it is seen, practically consists of a vibrating lever and means for moving laterally the working position of the same. By this construction a much better buttonhole is not only produced, but a large saving in machinery is made, securing an economy in the power for running the same and in the general wearing of the machine.

In the stop-motion employed by me will be found a mechanism which produces the least possible jar in stopping the machine. It will be noted that it is self-tightening. It is supported by springs affording always a yielding form of action, which produces, however, a positive result.

The auxiliary cutter-holder is designed to prevent the depression of the knife from any cause at the wrong time. For instance, if for any reason it is desired to stop the machine suddenly by striking downward upon the forward end of the lever $14^a$ the machine will be at once stopped. The auxiliary holder, however, prevents the knife from descending in such a contingency unless the work-carrier is in such a position that the end of the buttonhole is being finished. The work, therefore, is in no danger of being cut improperly.

What I claim as new is—

1. In combination in a buttonhole-sewing machine, a stitch-forming mechanism comprising a vertically-reciprocating and laterally-vibrating needle-bar, a feed-wheel and means for operating the same, a work-carrier reciprocated through the movements of the said feed-wheel, and means adapted at a predetermined point in the rotation of the said feed-wheel, to move the working position of the needle-bar laterally.

2. In combination in a buttonhole-sewing machine, a stitch-forming mechanism comprising a vertically-reciprocating and laterally-vibrating needle-bar, a reciprocating work-carrier, means adapted to move the working position of the needle-bar laterally during a predetermined part of the movement of the work-carrier and a predetermined lateral movement of the needle-bar.

3. In combination in a buttonhole-sewing machine, a stitch-forming mechanism comprising a vertically-reciprocating and laterally-vibrating needle-bar, a work-carrier, a rotating feed-wheel, means intermediate the feed-wheel and the work-carrier, the feed-wheel and the needle-bar, whereby the work-carrier is reciprocated and the working position of the needle-bar moved laterally during the change in the direction of the movement of the work-carrier.

4. In combination in a buttonhole-sewing machine, stitching mechanism, feeding mechanism, one of said mechanisms comprising a vibrating part through which the movement for producing the depth and edge stitches along the sides of the holes is produced, a cam, means for operating the said cam, means intermediate the cam and the vibrating part adapting the cam to move laterally the working position of the vibrating part and thereby change the stitching from one side of the buttonhole to the other, and means operated through the movements of the said cam adapted to increase and decrease the extent of the vibrations of the aforesaid vibrating part during the stitching from one side of the buttonhole to the other.

5. In combination in a buttonhole-sewing machine, mechanism for feeding the work, mechanism for stitching buttonholes comprising a vibrating needle-bar, a lever, a connection between said lever and the needle-bar, whereby the extent of the vibrations of the needle-bar is increased and decreased during a lateral movement in one direction of the lever, and means for actuating the said lever when stitching at or near the ends of the buttonholes.

6. In combination in a buttonhole-sewing machine, a stitch-forming mechanism comprising a vertically-reciprocating and laterally-vibrating needle, a feeding mechanism, the cam-lever 3, the lever 4, a connection between the lever 4 and the cam-lever 3, means intermediate the cam-lever 3 and the needle-bar whereby when the said cam-lever is oscillated the vibrations of the needle are increased and decreased, and means for actuating the lever 4.

7. In combination in a buttonhole-sewing machine, a reciprocating work-carrier, a stitch-forming mechanism comprising a vertically-reciprocating and laterally-vibrating needle-bar, means adapted to automatically move during a predetermined part of the movement of the work-carrier, the working position of the needle-bar in one direction laterally and simultaneously therewith a lateral vibration of the needle-bar in an opposite direction.

8. In combination in a buttonhole-sewing machine, a stitch-forming mechanism comprising a vertically-reciprocating needle-bar adapted to move laterally and a device for vibrating the same laterally, a work-carrier, mechanism for reciprocating the work-carrier comprising a feed-wheel, a ratchet-wheel, means intermediate the ratchet-wheel and the aforesaid device, whereby when the ratchet-wheel is rotated the extent of the lateral vibrations of the needle-bar is changed, and means for rotating the ratchet-wheel brought into engagement with the same by the movements of the feed-wheel during a predetermined part of the cycle of feed of the said feed-wheel.

9. In combination in a buttonhole-sewing machine, mechanism for stitching buttonholes comprising a vertically-reciprocating and laterally-vibrating needle-bar, a work-carrier, mechanism comprising a pawl-actuated feed-wheel for operating said work-carrier, a pawl-actuated ratchet-wheel separately mounted from the said pawl-actuated feed-wheel, means intermediate the said pawl-actuated ratchet-wheel and the aforesaid needle-bar, whereby the extent of the lateral vibrations of the needle-bar is increased and decreased during the stitching of a predetermined part of the buttonhole.

10. In combination in a buttonhole-sewing machine having a stitch-forming mechanism comprising a vertically-reciprocating and laterally-vibrating needle-bar, work-moving mechanism comprising a rotating feed-wheel, a device adapted automatically to increase and decrease the extent of the lateral vibrations of the needle during the stitching of a predetermined part of the buttonhole, and means adapting the feed-wheel to turn the said device into action.

11. In combination in a buttonhole-sewing machine, stitching and feeding mechanism for stitching the sides of the buttonholes comprising a feed-wheel, means for stitching the ends of the buttonholes comprising a cam, means intermediate the cam and the feed-wheel, whereby the cam is turned through the movements of the feed-wheel, and means independent of the feed-wheel whereby the cam is actuated during the stitching of the ends of the buttonholes.

12. In combination in a buttonhole-sewing machine, stitching and feeding mechanism for stitching the sides of the buttonholes comprising a feed-wheel, means for stitching the ends of the buttonholes comprising a cam adapted to turn on a pivot, a ratchet-wheel connected with said cam, an actuating device normally out of engagement with the teeth of the said ratchet-wheel, and means operated through the movements of the feed-wheel adapted to bring the actuating device into engagement with the teeth of the ratchet-wheel.

13. In combination in a buttonhole-sewing machine, stitching and feeding mechanism comprising a feed-wheel, a device for controlling the stitching at the ends of the buttonholes, a mutilated ratchet-wheel for actuating the said device, a pawl normally out of engagement with the teeth of the said ratchet-wheel, means for actuating the said pawl and means intermediate the feed-wheel and the ratchet-wheel adapted to turn the ratchet-wheel and thereby the teeth of the same into engagement with the pawl.

14. In combination in a buttonhole-sewing machine, stitching mechanism for forming the side stitches of the buttonhole, feeding mechanism comprising a feed-wheel, tacking mechanism comprising a ratchet-wheel, a pawl adapted to engage the said ratchet-wheel normally out of engagement with the teeth of the same, a pawl-lever for carrying said pawl, an eccentric on the lower shaft of the machine, a connection between the same and the pawl-lever, and means for bringing the aforesaid pawl into engagement with the teeth of the ratchet-wheel.

15. The combination in a buttonhole-sewing machine having a vertically-reciprocating needle-bar mounted and adapted to move laterally, of a work-carrier mechanism adapted to actuate the same comprising a feed-wheel, a device adapted to vibrate the needle-bar laterally, and means adapted to actuate said device, a second device adapted to vary the extent of the vibrations of the needle-bar and to bodily move the same laterally, an operative connection between the said second device and the first device, a ratchet-wheel adapted to actuate the second device, an actuating-pawl adapted to actuate the said ratchet-wheel, and means adapting the feed-wheel to turn the teeth of the said ratchet-wheel into engagement with the pawl.

In witness whereof I have hereunto set my hand in the presence of two subscribing witnesses.

WILLIAM N. PARKES.

Witnesses:
CHESTER H. HIGGINS,
B. M. SCOTT.